March 2, 1948. F. C. LAWSON 2,436,893
FLUID DRIVE FOR MOTORCYCLES
Filed Feb. 16, 1945 2 Sheets-Sheet 1

Inventor
Frank C. Lawson,

By *Clarence A. O'Brien
and Harvey B. Jacobson*
Attorneys

March 2, 1948. F. C. LAWSON 2,436,893
FLUID DRIVE FOR MOTORCYCLES
Filed Feb. 16, 1945 2 Sheets-Sheet 2
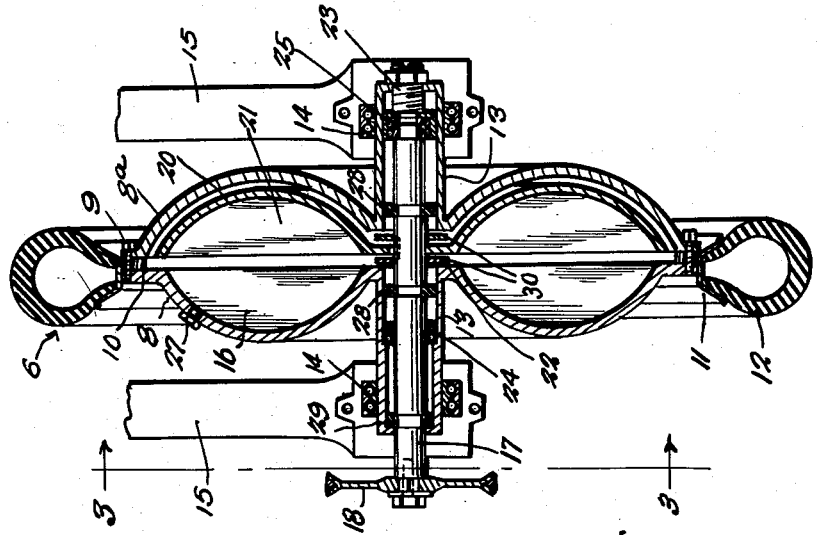
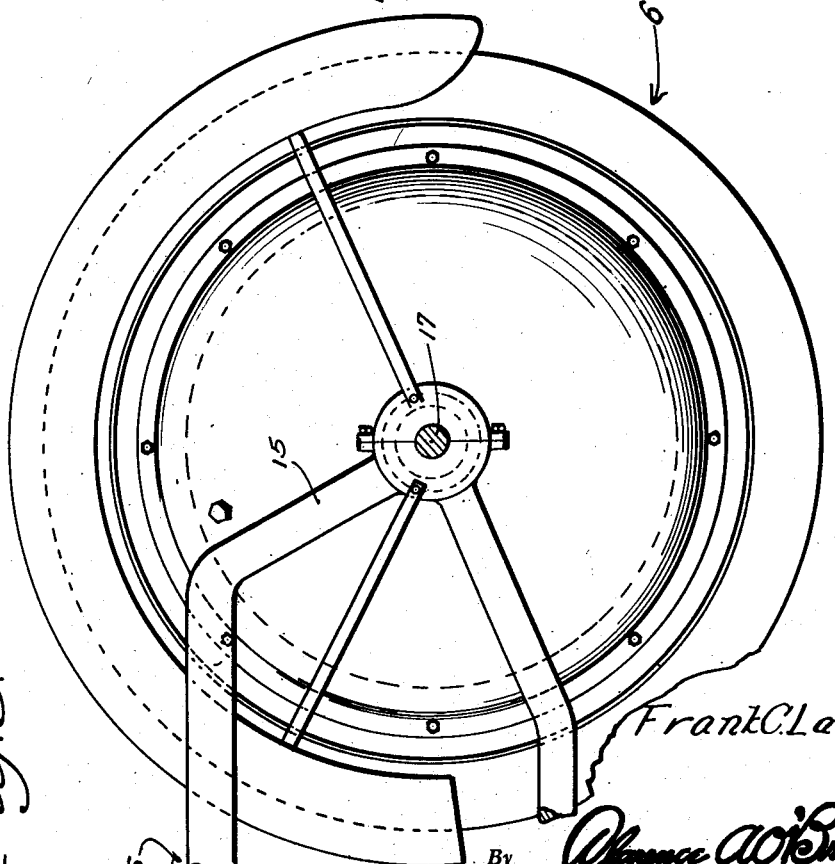
Inventor
Frank C. Lawson
By
Attorneys Patented Mar. 2, 1948

2,436,893

UNITED STATES PATENT OFFICE 2,436,893

FLUID DRIVE FOR MOTORCYCLES

Frank C. Lawson, Anderson, Ind.

Application February 16, 1945, Serial No. 578,145

1 Claim. (Cl. 180—33)

This invention relates to a driving means for motorcycles, and the primary object of the invention is to eliminate the usual separate transmission mechanism between the motor or engine and the driving and supporting wheel of the motorcycle.

More specifically, the present invention contemplates the provision of a driving means for motorcycles in which a fluid transmission mechanism is embodied directly in the driving and supporting wheel of the motorcycle.

A more specific object of the invention is to provide a construction of the above kind which is simple, efficient, and otherwise well adapted to meet with the requirements for a successful commercial use.

Other objects and advantages of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 2 is a transverse section taken on line 2—2 of Figure 1.

Figure 3 is a vertical section taken on the plane of line 3—3 of Figure 2.

Figure 1:
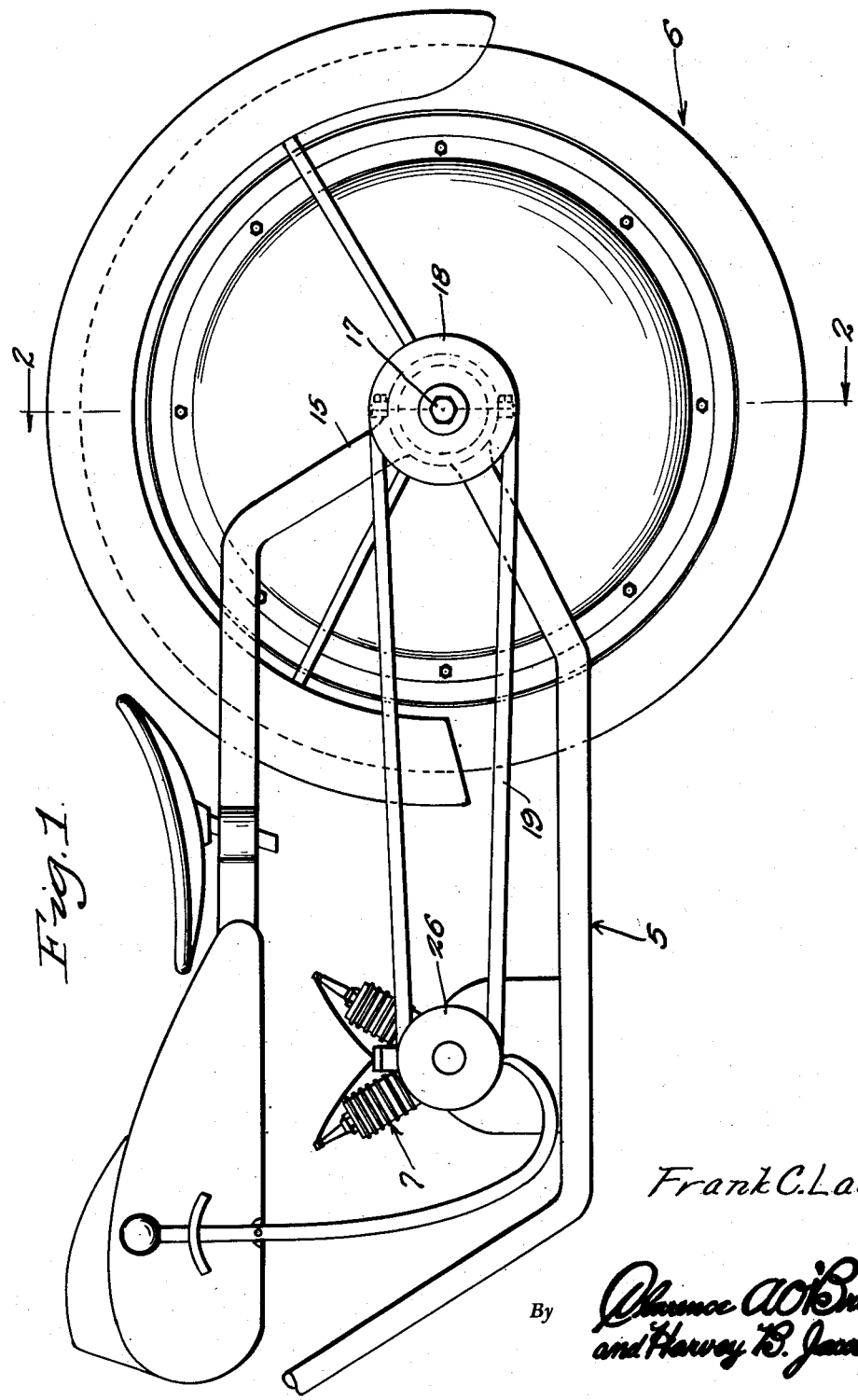
Figure 1 is a fragmentary side elevational view showing the rear portion of a motorcycle equipped with driving means embodying the present invention.

Referring in detail to the drawings, 5 indicates the frame of a motorcycle and 6 the driving and supporting wheel thereof (preferably the rear wheel of the motorcycle). The usual motor or internal combustion engine 7 for driving the wheel 6 is mounted in the intermediate portion of the frame 5, as usual.

In accordance with the present invention, a fluid drive device is incorporated directly in the construction of the wheel 6, and the body of the latter consists of a housing composed of sections 8 and 8a bolted together at their margins, as at 9, and having an oil seal gasket 10 interposed between the margins thereof. The housing section 8 carries a suitable rim 11 having a pneumatic tire 12 mounted thereon. Each housing section 8 and 8a has a lateral hub 13 journaled at 14 in a fork member 15 of the frame 5, and a plurality of radially disposed vanes 16 project inwardly from the inner face of the housing section 8.

Journaled in the hubs 13 of the housing sections 8 and 8a is a driven shaft 17, one end of which projects beyond the adjacent fork member 15 and has a drive wheel 18 secured thereon. An endless driving member 19 operatively connects the drive shaft of motor 7 with the shaft 17, and it is evident that a sprocket gearing may be used even though a belt gearing is illustrated in which the wheel 18 is a pulley wheel adapted for cooperation with a driving belt of the V type.

Fixed on the intermediate portion of shaft 17 is an impeller consisting of a dished disc 20 disposed in the housing adjacent the housing section 8a and having a plurality of radial vanes 21 that project toward the vanes 16. This broad type of fluid drive device is old per se, and an example thereof is disclosed in the U. S. patent to W. V. Maze, 2,294,994, dated September 8, 1942. A spacing washer 22 is provided between the central portion of impeller disc 20 and the adjacent portion of housing section 8 so as to insure clearance between the same. Proper clearance between the impeller disc 20 and the housing section 8a is effected by proper axial adjustment of shaft 17 through the medium of adjusting means generally indicated at 23 associated with the end of shaft 17 opposite that which carries the drive wheel 18. Suitable load and thrust bearings are respectively provided at 24 between the hubs 13 and shaft 17 and for said shaft 17 at 25. The endless driving member 19 passes around a drive wheel 26 on the drive shaft of motor 7, and the housing 8, 8a is charged with a desired quantity of oil or other fluid through a filler opening equipped with a closure plug 27. Oil seals are provided at 28 and 29, and spacer washers 30 are provided on shaft 17 to prevent contact of the hub of the impeller with the housing and resultant damage thereto by reason of improper use of adjusting means 23.

In operation, shaft 17 is driven by motor 7 through the gearing 26, 19, 18. Rotation of shaft 17 is imparted to impeller disc 20, and the vanes 21 throw the fluid against vanes 16 of the wheel or driven member, causing the assembly to turn as a unit. In this way, a separate transmission mechanism between the motor and the driving and supporting wheel is rendered unnecessary. It will be quite evident that, by means of the present invention, a vehicle may be provided which is of minimum weight, of maximum simplicity, and extremely economical to manufacture and operate.

Minor changes in details of construction are contemplated, such as fairly fall within the spirit and scope of the invention as claimed.

What I claim is:

In a motorcycle of the tandem two-wheel type, a motorcycle frame having spaced rear fork members, a ground-engaging traction wheel disposed between said fork members, said wheel including a fluid containing housing provided with a peripheral tire and having spaced laterally projecting hub members journaled at their outer ends in said fork members, said housing being provided with substantially radial internal vanes on one side thereof, a driven shaft journaled in said hub members and having an end projecting from one of the latter outwardly of the adjacent fork member, an impeller disk rotatable in the housing and fixed on said driven shaft between said hub members, said impeller disk having substantially radial vanes coacting with the housing vanes to drive the housing through the medium of the fluid within the latter, a motor mounted in the motorcycle frame forwardly of said wheel, and a driving connection between the motor and the projecting end of said driven shaft.

FRANK C. LAWSON.

REFERENCES CITED

The following references are of record in the file of this patent:

UNITED STATES PATENTS

| Number | Name | Date |
| --- | --- | --- |
| 2,221,705 | Glynn, Jr. | Nov. 12, 1940 |
| 2,294,994 | Maze | Sept 8, 1942 |